US009203659B2

(12) United States Patent
Choi et al.

(10) Patent No.: US 9,203,659 B2
(45) Date of Patent: Dec. 1, 2015

(54) COMPUTING SYSTEM WITH INTERFERENCE CLASSIFICATION MECHANISM AND METHOD OF OPERATION THEREOF

(71) Applicant: Samsung Electronics Co., Ltd., Suwon-si, Gyeonggi-Do (KR)

(72) Inventors: Yoo Jin Choi, San Diego, CA (US); Dongwoon Bai, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/297,377

(22) Filed: Jun. 5, 2014

(65) Prior Publication Data

US 2014/0362958 A1    Dec. 11, 2014

Related U.S. Application Data

(60) Provisional application No. 61/832,718, filed on Jun. 7, 2013.

(51) Int. Cl.

| | |
|---|---|
| *H04B 1/10* | (2006.01) |
| *H04L 25/03* | (2006.01) |
| *H04L 27/00* | (2006.01) |
| *H04B 15/00* | (2006.01) |
| *H04L 25/02* | (2006.01) |

(52) U.S. Cl.
CPC ............ *H04L 25/03006* (2013.01); *H04B 1/10* (2013.01); *H04B 15/00* (2013.01); *H04L 25/021* (2013.01); *H04L 25/03993* (2013.01); *H04L 27/0012* (2013.01)

(58) Field of Classification Search
CPC ..................... H04L 25/03006; H04L 27/0012; H04L 25/03993; H04B 15/00; H04B 1/10; H04B 1/1027
See application file for complete search history.

(56) References Cited

U.S. PATENT DOCUMENTS

| | | | | |
|---|---|---|---|---|
| 7,822,154 | B2* | 10/2010 | Chen et al. .................... | 375/346 |
| 2002/0137485 | A1* | 9/2002 | Nilsson et al. ............. | 455/184.1 |
| 2005/0068918 | A1* | 3/2005 | Mantravadi et al. .......... | 370/328 |
| 2005/0190868 | A1* | 9/2005 | Khandekar et al. ........... | 375/346 |
| 2005/0220174 | A1* | 10/2005 | Mills et al. ..................... | 375/132 |
| 2005/0276361 | A1* | 12/2005 | Kim et al. ...................... | 375/347 |
| 2007/0071073 | A1* | 3/2007 | Wang ............................. | 375/148 |
| 2007/0297495 | A1* | 12/2007 | Visoz et al. ................... | 375/148 |

(Continued)

OTHER PUBLICATIONS

S.Bishnoi, K.Yadav, and D.Mahor, "Coherent Modulation Classification of QAM Signals in Presence of Gaussian Noise", International Journal of Advanced Research in Computer Science and Software Engineering, vol. 3, Iss. 6, www.ijarcsse.com, Jun. 2013.

(Continued)

*Primary Examiner* — Jean B Corrielus
(74) *Attorney, Agent, or Firm* — IP Investment Law Group (57) ABSTRACT

A computing system includes: an antenna configured to receive a receiver signal for representing a serving signal and an interference signal; a communication unit, coupled to the antenna, configured to: calculate a decoding result based on the receiver signal, generate an interference modulation estimate based on the decoding result and the receiver signal, and calculate a content result based on the interference modulation estimate for representing the serving signal.

20 Claims, 4 Drawing Sheets

(56) References Cited

U.S. PATENT DOCUMENTS

| | | | | |
|---|---|---|---|---|
| 2009/0116541 | A1* | 5/2009 | Farrokhi et al. | 375/136 |
| 2013/0077670 | A1* | 3/2013 | Wang et al. | 375/233 |
| 2013/0114648 | A1* | 5/2013 | Bittner et al. | 375/211 |
| 2013/0301432 | A1* | 11/2013 | Hammarwall et al. | 370/252 |
| 2014/0362942 | A1* | 12/2014 | Wood et al. | 375/267 |

OTHER PUBLICATIONS

O. Ozdemir, R. Li, and P. Varshney, "Hybrid Maximum Likelihood Modulation Classification Using Multiple Radios", IEEE Communications Letter, http://arxiv-web3.library.cornell.edu/pdf/1303.0775v1.pdf, Mar. 2013.

F. Hameed, O. Dobre, and D. Popescu, "On the Likelihood-Based Approach to Modulation Classification", IEEE Transactions on Wireless Communicaiton, vol. 8, No. 12, http://www.ece.odu.edu/~dpopescu/papers/modclas.pdf, Dec. 2009.

D. Bai, C. Park, J. Lee, H. Nguyen, J. Singh, A. Gupta, Z. Pi, T. Kim, C. Lim, M. Kim, and I. Kang, "LTE-advanced modem design: challenges and perspectives," IEEE Commun. Mag., vol. 50, No. 2, pp. 178-186, Feb. 2007.

J. Winters, "Optimum combining in digital mobile radio with cochannel interference," IEEE J. Sel. Area. Comm., vol. 2, No. 4, pp. 528-539, 1984.

J. Lee, D. Toumpakaris, and W. Yu, "Interference mitigation via joint detection", IEEE J. Sel. Area. Comm., vol. 29, No. 6, pp. 1172-1184, 2011.

R. Ghaffar and R. Knopp, "Interference suppression strategy for cell-edge users in the downlink," IEEE T. Wirel. Commun., vol. 11, No. 1, pp. 154-165, 2012.

\* cited by examiner

COMPUTING SYSTEM WITH INTERFERENCE CLASSIFICATION MECHANISM AND METHOD OF OPERATION THEREOF

CROSS-REFERENCE TO RELATED APPLICATION(S)

This application claims the benefit of U.S. Provisional Patent Application Ser. No. 61/832,718 filed Jun. 7, 2013, and the subject matter thereof is incorporated herein by reference thereto.

TECHNICAL FIELD

An embodiment of the present invention relates generally to a computing system, and more particularly to a system with interference classification mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with interference classification mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an antenna configured to receive a receiver signal for representing a serving signal and an interference signal; a communication unit, coupled to the antenna, configured to: calculate a decoder output based on the receiver signal, generate an interference modulation estimate based on the decoder output and the receiver signal, and calculate a content result based on the interference modulation estimate for representing the serving signal.

An embodiment of the present invention provides a method of operation of a computing system including: receiving a receiver signal for representing a serving signal and an interference signal; calculating a decoder output based on the receiver signal; generating an interference modulation estimate with a communication unit based on the decoder output and the receiver signal; and calculating a content result based on the interference modulation estimate for representing the serving signal.

An embodiment of the present invention provides a non-transitory computer readable medium including instructions for operating a computing system including: receiving a receiver signal for representing a serving signal and an interference signal; calculating a decoder output based on the receiver signal; generating an interference modulation estimate with a communication unit based on the decoder output and the receiver signal; and calculating a content result based on the interference modulation estimate for representing the serving signal.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments of the present invention can be used to communicate a serving signal between devices in a computing system. The serving signal can be received along with an interference signal at a device as a receiver signal. The computing system can remove a portion of the receiver signal corresponding to the serving signal using a decoding result.

The computing system can further whiten a residual signal resulting from removing the decoding result. The computing system can use the whitened instance of the residual signal to generate an interference modulation estimate for approximating an interference modulation scheme for the interference signal. The computing system can use the interference modulation estimate to further process for the serving signal.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Figure 1:
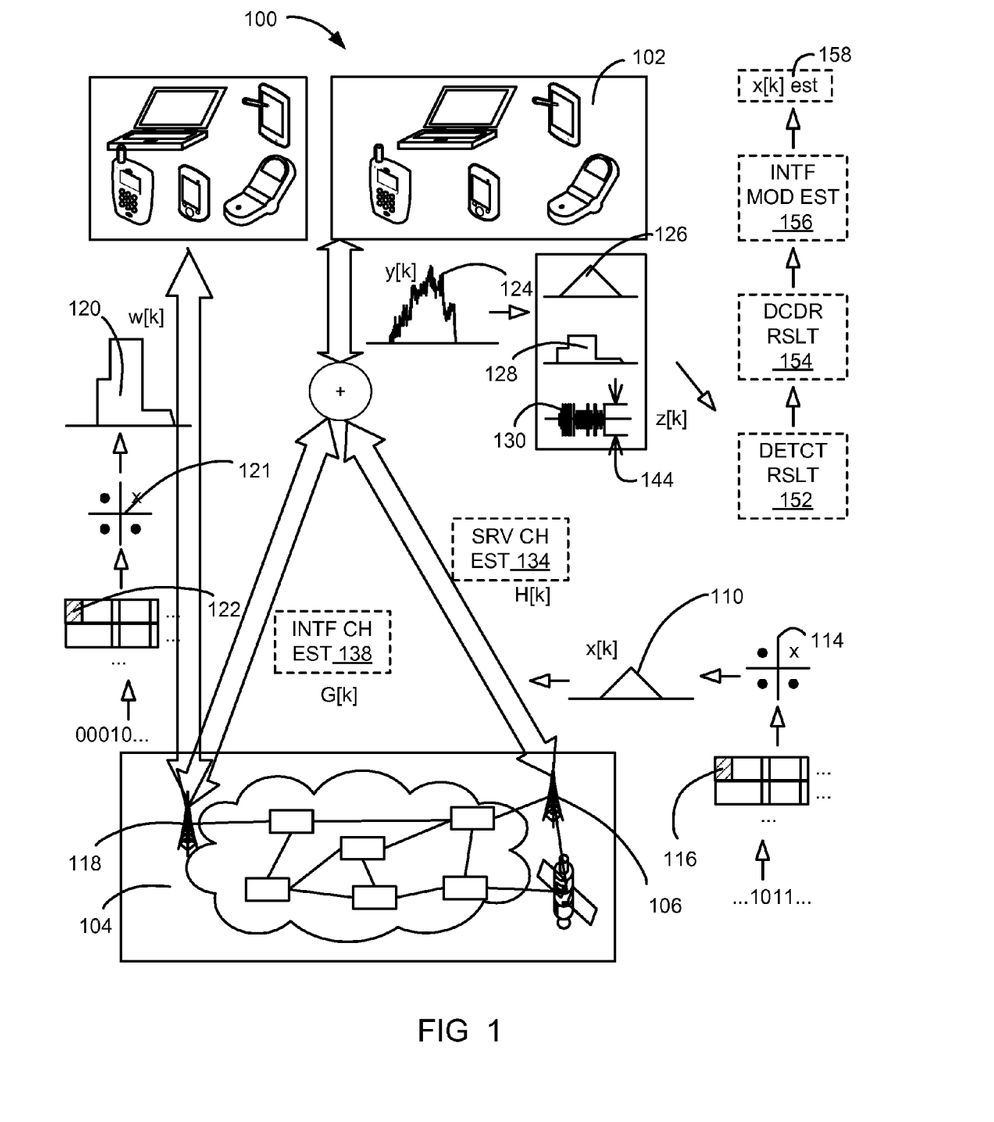
FIG. 1 is a computing system with interference classification mechanism in an embodiment of the present invention.

Referring now to FIG. 1, therein is shown a computing system 100 with interference classification mechanism in an embodiment of the present invention. The computing system 100 includes a first device 102, such as a mobile device including a cellular phone or a notebook computer, connected to a network 104. The network 104 is a system of wired or wireless communication devices or means that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The computing system 100 can include a second device 106 for directly or indirectly linking and communicating with the first device 102. The network 104 can include the second device 106. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a base station. Also for example, the second device 106 can be a communication device or a processing component included or with a cell tower, a wireless router, an antenna, or a combination thereof being used to communicate with, such as by sending signals to or receiving signals from, the first device 102 including a mobile computing device.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The second device 106 can communicate serving content by transmitting a serving signal 110 intended for the first device 102. The serving content can include data from a transmitting device intended for communication by reproduction or processing at a receiving device. For example, the serving content can be a sequence of bits intended for displaying, audibly recreating, executing instructions, storing, or a combination thereof at a receiving device, such as the first device 102.

The second device 106 can modify the serving content to generate and transmit the serving signal 110. The serving signal 110 is data actually transmitted by a device for communication and having a format for transmission. The serving signal 110 can be represented as '$x[k]=[x_1[k], \ldots, x_L[k]]^T$'. The serving signal 110 can be communicated using 'L' layers for multiple-input multiple-output (MIMO) transmission format utilizing multiple antennas.

The second device 106 can generate the serving signal 110 by modifying, such as by interleaving, encoding, precoding, adding formatting information, or a combination thereof, the serving content according to methods or standardizations predetermined by the computing system 100 to generate a code word. The serving signal 110 can be based on point-to-point binary codes, such as turbo codes or low-density parity check codes.

The second device 106 can generate the serving signal 110 using one or more symbols according to a serving modulation scheme 114. The serving modulation scheme 114 can be a system of signal variations or symbols for representing specific information. The serving modulation scheme 114 can be intended or utilized for a specific instance of communication, such as in time or occasion, for communicating between a specific set of corresponding devices. For example, the serving modulation scheme 114 can be for communicating between the first device 102 and the second device 106.

The serving modulation scheme 114 can include analog or digital modulation methods, such as amplitude modulation or various keying techniques. For example, the serving modulation scheme 114 can include phase-shift keying (PSK) such as quadrature PSK (QPSK), frequency-shift keying (FSK), amplitude-shift keying (ASK), quadrature amplitude modulation (QAM), variations such as binary or 64 symbol schemes thereof, or a combination thereof.

The serving signal 110 can further include a serving reference segment 116. The serving reference segment 116 is a known or designated information transmitted by a device used to determine various types of information at a receiving device. The serving reference segment 116 can include a bit, a symbol, a signal pattern, a signal strength, frequency, phase, duration, or a combination thereof predetermined by the computing system 100, a standard, or a combination thereof. The details of the serving reference segment 116 can be known and used by one, multiple, or all devices in the computing system 100.

The serving reference segment 116 can include generic information, cell-specific information, or a combination thereof. The serving reference segment 116 can further include information regarding a transmission format. The detail, the structure, the content, or a combination thereof for the serving reference segment 116 can be used by the receiving device, such as the first device 102, to determine information regarding a mechanism used to transmit data.

The computing system 100 can further include an interference signal 120 from an interference source 118. The interference source 118 can include any source generating signals unintended for a specific receiver. For example, the interference source 118 can include various transmitters, including a base station or a satellite dish, another mobile communication device, such as a smart phone or a laptop computer, broadcasting station, such as for television or radio, or a combination thereof separate from the first device 102, the second device 106, or a combination thereof.

The interference signal 120 can include data unintended for communication at the receiving device. The interference signal 120 can include data or information having similar format or use as the serving content as described above, but intended for communication with a different device and received by the first device 102 or for a purpose not currently utilized by the first device 102. The interference signal 120 can be represented as '$w[k]=[w_1[k], \ldots, w_L[k]]^T$'. The interference signal 120 can be based on 'L" layers.

For illustrative purposes, the interference signal 120 is described as originating from the interference source 118. However, it is understood that the interference signal 120 can be originated from the first device 102, the second device 106, or a combination thereof communicating information unintended for exchange between the first device 102 and the second device 106, or a combination thereof.

The interference signal 120 can be based on an interference modulation scheme 121. The interference modulation scheme 121 can be a system of signal variations similar in nature to the serving modulation scheme 114, but intended or utilized for communication with a device or a process other than the receiving device or the applicable process therein.

For example, the interference modulation scheme 121 can include modulation scheme of a signal unintended for the first device 102 or the second device 106 receiving the interference signal 120. Also for example, the interference modulation scheme 121 can include modulation scheme for a signal intended for the first device 102 or the second device 106 but not for a relevant process or time, such as a delayed signal or including erroneous recipient.

The independent modulation scheme 121 can be unknown to the unintended device receiving the interference signal 120 at the time of reception. The interference modulation scheme 121 can be independent of the serving modulation scheme 114. For example, the independent modulation scheme 121 can be same as or different from the serving modulation scheme 114.

The interference signal 120 can include an interference reference segment 122 corresponding to the interference source 118. The interference reference segment 122 a known or designated information transmitted by the interference source 118 intended to determine various types of information at a particular intended device. The interference reference segment 122 can be similar to the serving reference segment 116 but specific to the interference source 118 instead of the second device 106. The interference reference segment 122 can include information identifying or unique to the interference source 118.

The computing system 100 can include a receiver signal 124 for communicating the communication content between devices. For example, the first device 102 can receive the receiver signal 124 as data or information identified or determined by the first device 102 for communication. The first device 102 can receive the receiver signal 124 including information or data from various sources. For example, the receiver signal 124 can include a receiver serving portion 126, a receiver interference portion 128, a noise portion 130, or a combination thereof.

The receiver serving portion 126 is a part of the receiver signal 124 corresponding to the serving content. For example, the receiver serving portion 126 can correspond to data or information transmitted by the second device 106, such as the serving signal 110. The receiver serving portion 126 can be based on the serving reference segment 116 unique to a corresponding device for the communication.

The receiver serving portion 126 can be a result of the serving signal 110 traversing a serving channel. The serving channel can be a direct link between corresponding devices, such as between the first device 102 and the second device 106. The serving channel can also include repeaters, amplifiers, or a combination thereof there-between for an indirect link. The serving channel can include a specific instance or value of communication frequency, time slot, packet designation, transmission rate, channel code, or a combination thereof used for transmitting signals between intended devices.

The serving channel can further include physical characteristics unique to geographic locations associated with the intended devices. The serving channel can include structures or influences, such as fading characteristics of signals or causes for unique delay or reflection of signals, affecting the transmission of wireless signals. The serving channel can distort or alter the signals traversing therein.

The computing system 100 can calculate a serving channel estimate 134 to characterize the serving channel or the effects of traversing the serving channel. For example, the serving channel estimate 134 can represent fading, distortions or alterations from delayed signals or echoes, or a combination thereof of the serving channel. The computing system 100 can calculate the serving channel estimate 134 using the serving reference segment 116 represented in the receiver serving portion 126.

The serving channel estimate 134 can be represented as '$H[k]=[h_{ij}[k]]_{N_r \times N_t}$'. The term '$N_t$' can represent number of transmit antennas corresponding to the second device 106 for the serving signal 110.

The receiver interference portion 128 is a part of the receiver signal 124 corresponding to the information unintended for the receiver device. The receiver interference portion 128 can degrade or alter the receiver serving portion 126, becoming a hindrance in communicating the serving content between intended devices.

For example, the receiver interference portion 128 can correspond to data or information transmitted by the interference source 118, such as the interference signal 120. Also for example, the receiver interference portion 128 can correspond to data or information transmitted by the second device 106 using a frequency or an identifier unintended for communicating with the first device 102.

Similarly, the receiver interference portion 128 can be a result of the interference signal 120 traversing an interference channel. The interference channel can be a direct or an indirect link between unintended communication counterparts, such as between the first device 102 and the interference source 118 or between the first device 102 and the second device 106 for unintended data.

The interference channel can be similar to the serving channel, but specific to communicating unintended information. For example, the interference channel can include a specific instance or value of communication frequency, time slot, packet designation, transmission rate, channel code, or a combination thereof used for transmitting signals between unintended devices. Also for example, the interference channel can include physical characteristics unique to geographic locations associated with the intended devices. The interference channel can distort or alter the signals traversing therein.

The computing system 100 can calculate an interference channel estimate 138 to characterize the interference channel or the effects of traversing the interference channel. For example, the interference channel estimate 138 can represent fading, distortions or alterations from delayed signals or echoes, or a combination thereof specific to the interference channel. The computing system 100 can calculate the interference channel estimate 138 using the interference reference segment 122 represented in the receiver interference portion 128.

The interference channel estimate 138 can be represented as $$'G[k] = [g_{ij}[k]]_{N_r \times N_t'}'.$$

The term '$N_t'$' can represent number of transmit antennas corresponding to the interference source 118 for the interference signal 120.

The noise portion 130 can include error or deviations in the data. The noise portion 130 can be from a processing channel or a route for the data, hardware components processing signals, background noise, or a combination thereof. The noise portion 130 can also include changes in the signal or the data due to hardware component limitations, such as tolerance levels or cross-talk between components. The noise portion 130 can be independent of the transmit symbols.

The noise portion 130 can be additive in nature and have a random Gaussian or Rayleigh distribution for the changes. Moreover, the noise portion 130 can be independent and identically distributed (i.i.d.) sequence of uncorrelated circularly symmetric complex Gaussian random vector with zero mean. The noise portion 130 can be represented as '$z[k]=[z_1[k], \ldots , z_{N_r}[k]]^T$'.

The noise portion 130 can be characterized by a noise variance 144. The noise variance 144 is a statistical characteristic of the noise portion 130. The noise variance 144 can be a covariance of the noise portion 130. The noise variance 144 can be a measure of spread, distancing, density, power, or a combination thereof for the noise portion 130.

The noise variance 144 can be known to the computing system 100. For example, the computing system 100 can estimate the noise variance 144, represented as '$\sigma^2$' or '$\sigma^2 I_{N_r}$' with '$I_{N_r}$' further representing an identity matrix of size '$N_r$'. Also for example, the computing system 100 can include the noise variance 144 predetermined by the computing system 100, such as in a look-up table, determined using a dedicated device or circuitry, or a combination thereof.

The receiver serving portion 126 can be a combination of the serving channel estimate 134 and the serving signal 110. The receiver interference portion 128 can be a combination of the interference channel estimate 138 and the interference signal 120. The receiver signal 124 can be a combination of the receiver serving portion 126 and the receiver interference portion 128. The receiver signal 124 can be represented as:

$$y[k]=H[k]x[k]+G[k]w[k]+z[k]. \qquad \text{Equation (1).}$$

The computing system 100 can process the receiver signal 124 to recover the serving content. The computing system 100 can process the receiver signal 124 in a variety of ways. For example, the computing system 100 can detect, decode, deinterleave, interleave, or a combination thereof. As a more specific example, the computing system 100 can produce a detection result 152, a decoding result 154, or a combination thereof.

The detection result 152 is an output of extracting particular information from a larger stream of information without specific cooperation from or synchronization with the sender. The detection result 152 can include particular information extracted from the receiver signal 124 or electromagnetic waves available to the receiving device, such as the first device 102 or the second device 106.

The detection result 152 can be based on frequency, magnitude, phase, signal shape, timing, or a combination thereof, known or available instances of the serving modulation scheme 114, filters, or a combination thereof. The detection result 152 can be a posteriori value for the detection process. The detection result 152 can be further based on a priori value preceding the processing mechanism.

The decoding result 154 is an output of reversing an encoding process performed by a transmitting process for transforming information from one format into another. The decoding result 154 can be based on various coding mechanisms, such as turbo-coding mechanism or polar-coding mechanism.

The detection result 152, the decoding result 154, or a combination thereof can be represented as a logarithmic value, a likelihood value, a ratio, or a combination thereof. For example, the detection result 152, the decoding result 154, or a combination thereof can be a log-likelihood ratio (LLR). The detection result 152, the decoding result 154, or a combination thereof can represent a soft-decision process. The detection result 152, the decoding result 154, or a combination thereof can represent a likelihood value associated with a specific possible value.

The computing system 100 can further use the detection result 152, the decoding result 154, or a combination thereof to produce an interference modulation estimate 156. The interference modulation estimate 156 is a result of processing the receiver signal 124 to approximate the interference modulation scheme 121.

The computing system 100 can utilize the interference modulation estimate 156 in recovering the serving content from the receiver signal 124. The computing system 100 can produce a content result 158 based on the interference modulation estimate 156. The content result 158 can include data bits representing an estimate of the serving content originally intended by the serving signal 110. Details regarding the interference modulation estimate 156 and the content result 158 will be described below.

For illustrative purposes, the computing system 100 is described as the second device 106 transmitting information and the first device 102 receiving the transmitted information.

However, it is understood that the computing system 100 can have the second device 106 as the receiving device and the first device 102 as the transmitting device.

Also for illustrative purposes, the computing system 100 is described as having one instance of the interference signal 120 and one instance of the interference source 118 relative to communicating between the first device 102 and the second device 106. However, it is understood that the computing system 100 can experience and process for multiple interference signals and sources.

Figure 2:
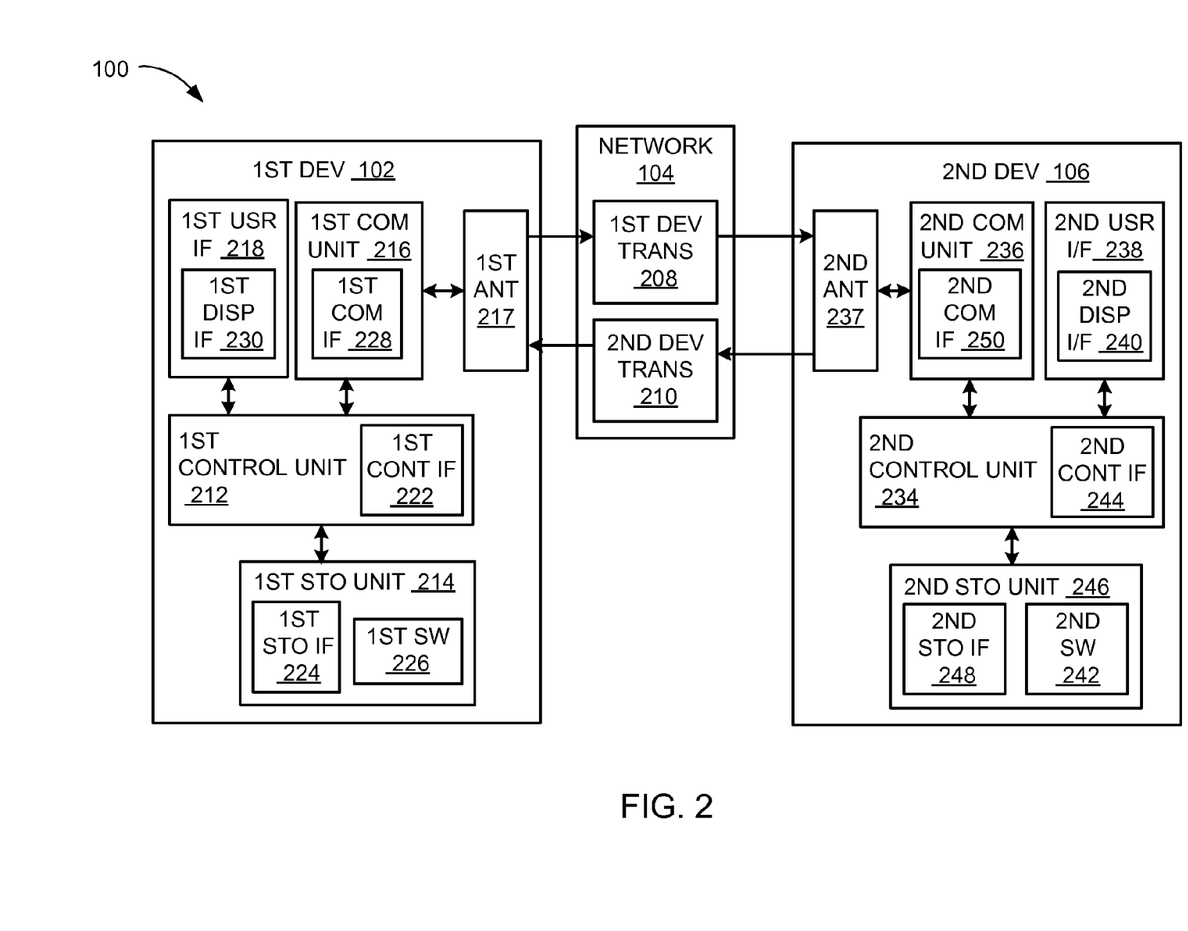
FIG. 2 is an exemplary block diagram of the computing system.

Referring now to FIG. 2, therein is shown an exemplary block diagram of the computing system 100. The computing system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first antenna 217. The first antenna 217 can be a device or a portion of a device for physically communicating signals. The first antenna 217 can communicate by transmitting or receiving signals to or from another device. The first antenna 217 can be for wireless signals. The first antenna 217 can include an omnidirectional antenna, a wire, an antenna chip, a ceramic antenna, or a combination thereof.

The first antenna 217 can detect or respond to a power in electromagnetic waves and provide the detected result to the first communication unit 216 to receive a signal, including the second device transmission 210. The first antenna 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the network 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second antenna 237. The second antenna 237 can be a device or a portion of a device for physically communicating signals. The second antenna 237 can communicate by transmitting or receiving signals to or from another device. The second antenna 237 can be for wireless signals. The second antenna 237 can include an omnidirectional antenna, a wire, an antenna chip, a ceramic antenna, or a combination thereof.

The second antenna 237 can detect or respond to a power in electromagnetic waves and provide the detected result to the second communication unit 236 to receive a signal, including the first device transmission 208. The second antenna 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 3:
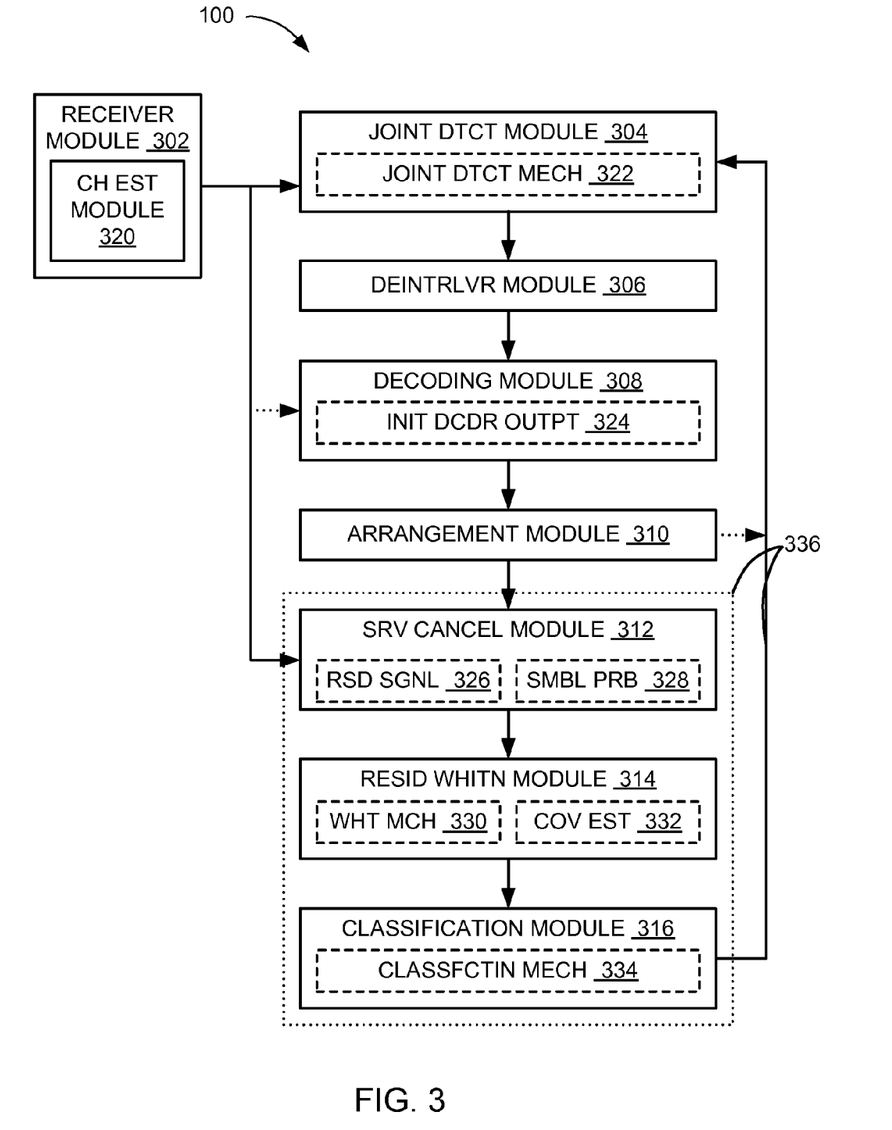
FIG. 3 is a control flow of the computing system.

Referring now to FIG. 3, therein is shown a control flow of the computing system 100. The computing system 100 can include a receiver module 302, a joint detection module 304, a deinterleaver module 306, a decoding module 308, an arrangement module 310, a serving cancellation module 312, a residual whitening module 314, a classification module 316, or a combination thereof.

The receiver module 302 can be coupled to the joint detection module 304, the serving cancellation module 312, or a combination thereof. The joint detection module 304 can be further coupled to the deinterleaver module 306, the classification module 316, or a combination thereof. The deinterleaver module 306 can be coupled to the decoding module 308, which can be further coupled to the arrangement module 310. The arrangement module 310 can be coupled to the serving cancellation module 312, which can be further coupled to the residual whitening module 314. The residual whitening module 314 can be coupled to the classification module 316.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the receiver module 302 can be connected to one or more inputs or inputs of the joint detection module 304, the serving cancellation module 312, or a combination thereof using conductors or the transmission channel without intervening modules or devices there-between. Also for example, the joint detection module 304 can be coupled to the deinterleaver module 306, the classification module 316, or a combination thereof directly, similar to the receiver module 302 and the joint detection module 304, or indirectly using a wireless channel with a repeater, a switch, a routing device, or a combination thereof. The above described modules can be coupled in similar ways.

The computing system 100 can communicate with or using a device, such as by displaying images, recreating sounds, exchanging process steps or instructions, or a combination thereof. The computing system 100 can communicate information between devices. The receiving device can further communicate with the user by displaying images, recreating sounds, exchanging process steps or instructions, or a combination thereof according to the information communicate to the device.

The receiver module 302 is configured to receive the receiver signal 124 of FIG. 1. The receiver module 302 can receive the receiver signal 124 corresponding to and representing the serving signal 110 of FIG. 1, the interference signal 120 of FIG. 1, or a combination thereof. The receiver module 302 can receive the receiver signal 124 as the serving signal 110, the interference signal 120, or a combination thereof having respectively traversed the serving channel, the interference channel, or a combination thereof.

The receiver module 302 can receive the receiver signal 124 by recording electrical power, voltage, current, or a combination thereof. For example, the receiver module 302 can receive the receiver signal 124 by recording energy levels or changes therein for the first antenna 217 of FIG. 2, the second antenna 237 of FIG. 2, the first communication interface 228 of FIG. 2, the second communication interface 250 of FIG. 2, the first control interface 222 of FIG. 2, the second control interface 244 of FIG. 2, or a combination thereof.

Also for example, the receiver module 302 can receive the receiver signal 124 by recording energy levels or changes received through a wireless antenna, a wire or a conductor, an instruction or a step for transferring data between devices, processes, instructions, between portions therein, or a combination thereof. Also for example, the receiver module 302 can record the receiver signal 124 by storing the energy levels or changes therein, according to a time, a sequence, or a combination thereof in the first communication unit 216 of FIG. 2, the second communication unit 236 of FIG. 2, the first storage unit 214 of FIG. 2, the second storage unit 246 of FIG. 2, or a combination thereof.

The receiver module 302 can process the receiver signal 124 to determine aspects thereof. For example, the receiver module 302 can determine a sample size, a sample index, the serving reference segment 116 of FIG. 1, the interference reference segment 122 of FIG. 1, the noise portion 130 of FIG. 1, or a combination thereof. The receiver module 302 can recognize based on a method or a process predetermined by the computing system 100 or a standard for controlling a sampling rate, a block size, a symbol size, or a combination thereof.

The receiver module 302 can further use a dedicated device, circuitry, process, or a combination thereof to determine the aspects of the receiver signal 124 including the noise portion 130. The receiver module 302 can also use known parts or aspects of the receiver signal to further identify appropriate instance of the values for other aspects as predetermined and stored by the computing system 100. The receiver module 302 can further determine the noise variance 144 of FIG. 1 using a statistical analysis based on the noise portion 130, based on values predetermined by the computing system 100, or a combination thereof.

The receiver module 302 can determine the aspects of the receiver signal 124 using the first communication unit 216, the second communication unit 236, the first control unit 212 of FIG. 2, the second control unit 234 of FIG. 2, or a combination thereof. The receiver module 302 can store the aspects of the receiver signal 124 in the first communication unit 216, the second communication unit 236, the first storage unit 214, the second storage unit 246, or a combination thereof.

The receiver module 302 can include a channel estimation module 320. The channel estimation module 320 is configured to characterize communication channels. For example, the channel estimation module 320 can determine the serving channel estimate 134 of FIG. 1, the interference channel estimate 138 of FIG. 1, or a combination thereof.

The channel estimation module 320 can use the serving reference segment 116, the interference reference segment 122, a portion in the receiver signal 124 corresponding thereto, or a combination thereof to determine the serving channel estimate 134, the interference channel estimate 138, or a combination thereof. The details, formats, requirements, or a combination thereof regarding the serving reference segment 116, the interference reference segment 122, or a combination thereof, such as regarding original frequency, phase, content, shape, or a combination thereof, can be predetermined by the communication standard, the computing system 100, or a combination thereof.

The channel estimation module 320 can compare the received instances of the receiver signal 124 or segments therein to the predetermined parameters for the serving reference segment 116, the interference reference segment 122, or a combination thereof. The channel estimation module 320 can further use frequency domain transformation or time domain transformation, convolution, transposition, basic mathematical operations, or a combination thereof with the predetermined or received instances of the reference communication, or both.

The channel estimation module 320 can further calculate the changes in magnitude, frequency, phase, or a combination thereof in the reference portion in the serving signal 110, the interference signal 120, or a combination thereof to the receiver signal 124. The channel estimation module 320 can further use various methods, such as the least square method, the least mean square (LMS) method, or the minimum mean square error (MMSE) method, to determine the serving channel estimate 134, the interference channel estimate 138, or a combination thereof.

The channel estimation module 320 can use the first communication unit 216, the second communication unit 236, the first control unit 212, the second control unit 234, or a combination thereof to determine the serving channel estimate 134, the interference channel estimate 138, or a combination thereof. The channel estimation module 320 can store the serving channel estimate 134, the interference channel estimate 138, or a combination thereof in the first communication unit 216, the second communication unit 236, the first storage unit 214, the second storage unit 246, or a combination thereof.

After receiving the receiver signal 124 and determining the aspects thereof, the control flow can pass to the joint detection module 304. The control flow can pass through a variety of ways. For example, control flow can pass by having processing results of one module passed to another module, such as by passing the receiver signal 124, the determined aspects thereof, or a combination thereof from the receiver module 302 to the joint detection module 304, by storing the processing results at a location known and accessible to the other module, such as by storing the receiver signal 124, the determined aspects thereof, or a combination thereof at a storage location known and accessible to the joint detection module 304, by notifying the other module, such as by using a flag, an interrupt, a status signal, or a combination for the joint detection module 304, or a combination of processes thereof.

The joint detection module 304 is configured to detect a symbol, a bit, or a combination thereof from the receiver signal 124. The joint detection module 304 can use a joint detection mechanism 322 for detecting the symbol, the bit, or a combination thereof corresponding to the serving signal 110, the interference signal 120, or a combination thereof. For example, the joint detection module 304 can detect symbols corresponding to the serving signal 110 and the interference signal 120 in the receiver signal 124.

The joint detection mechanism 322 is a process or a method for processing for information corresponding to the receiver signal 124 along with the interference signal 120. The joint detection mechanism 322 can detect symbols corresponding to the receiver signal 124 and other independent symbols corresponding to the interference signal 120.

The joint detection mechanism 322 can use an iterative process or method. The joint detection mechanism 322 can further implement a maximum-likelihood approach or a minimum-distance approach. The joint detection mechanism 322 can include a joint-detection-decoding process or method, an interference-aware detection process or method, or a combination thereof.

The joint detection module 304 can calculate the detection result 152 of FIG. 1 using the joint detection mechanism 322. The joint detection module 304 can process the receiver signal 124 according to the joint detection mechanism 322 to calculate the detection result 152. The joint detection module 304 can calculate the detection result 152 as LLR value, an a-posteriori value, or a combination thereof.

The joint detection module 304 can utilize the serving modulation scheme 114 of FIG. 1 in detecting the symbols. The joint detection module 304 can determine the serving modulation scheme 114 based on processing the receiver signal 124 or a known portion therein, based on previously exchanged data, such as during initiation or handover process, as predetermined by the computing system 100 or a standard, or a combination thereof.

The joint detection module 304 can be without any prior data regarding the interference modulation scheme 121 of FIG. 1. Moreover, the receiver signal 124 or previously exchanged data can be without data designated for notifying or processing for the interference modulation scheme 121. The computing system 100 can calculate the interference modulation estimate 156 of FIG. 1 without the designated or intended information. The joint detection module 304 can further utilize the interference modulation estimate 156 to detect the symbols corresponding to the serving signal 110 and the interference signal 120. Details regarding the interference modulation estimate 156 will be described below.

The joint detection module 304 can use the first communication unit 216, the second communication unit 236, the first control unit 212, the second control unit 234, or a combination thereof to calculate the detection result 152 from the receiver signal 124 corresponding to the serving signal 110 and the interference signal 120. The joint detection module 304 can store the detection result 152 in the first communication unit 216, the second communication unit 236, the first storage unit 214, the second storage unit 246, or a combination thereof.

After calculating the detection result 152, the control flow can be passed from the joint detection module 304 to the deinterleaver module 306. The control flow can pass similarly as described above between the receiver module 302 and the joint detection module 304 but using processing results of joint detection module 304, such as the detection result 152.

The deinterleaver module 306 is configured to arrange the detection result 152. The deinterleaver module 306 can arrange the detection result 152 according to a coding scheme predetermined by a standard, the computing system 100, or a combination thereof. For example, the deinterleaver module 306 can arrange the detection result 152 according to the turbo coding scheme or the polar coding scheme.

After arranging the detection result 152, the control flow can be passed from the deinterleaver module 306 to the decoding module 308. The control flow can pass similarly as described above between the receiver module 302 and the joint detection module 304 but using processing results of joint detection module 304, such as a deinterleaved instance of the detection result 152.

The decoding module 308 is configured to decode the receiver signal 124. The decoding module 308 can decode the receiver serving portion 126 of FIG. 1. The decoding module 308 can decode the receiver signal 124 to recover the serving signal 110 or the serving content therein. The decoding module 308 can be an interference aware decoder or a decoder for the joint-detector-decoder configuration.

The decoding module 308 can calculate the decoding result 154 of FIG. 1 based on the receiver signal 124. The decoding module 308 can calculate the decoding result 154 by processing the deinterleaved instance of the detection result 152 resulting from the receiver signal 124.

The decoding module 308 can calculate the decoding result 154 as LLR value, an a-posteriori value, or a combination thereof. The decoding module 308 can calculate the decoding result 154 based on:

$$\lambda_{ij}^{DEC}[k] = \log\frac{p(b_k = +1 \mid y)}{p(b_k = -1 \mid y)} = \log\frac{\sum_{x:b_k=+1} p(y \mid x)p(x)}{\sum_{x:b_k=-1} p(y \mid x)p(x)}. \quad \text{Equation (2)}$$

The term '$\lambda_{ij}^{DEC}[k]$' can represent the decoding result 154. The decoding result 154 can be based on likelihood values of original serving content being a specific value given the receiver signal 124.

The decoding module 308 can further utilize an initial decoding result 154. The initial decoding result 154 can be a value assigned to the decoding result 154 for an initial iteration of signal processing by the computing system 100.

The decoding module 308 can use the initial decoding result 154 based on 1, 0, or any decimal values or probability values there between. For example, the computing system 100 can use the initial decoding result 154 represented as:

$$\lambda_{ij}^{DEC}[k]=0. \quad \text{Equation (3)}.$$

The computing system 100 can initiate the signal processing with the decoding module 308 following the receiver module 302 with the initial decoding result 154 as the decoding result 154. The computing system 100 can further implement the decoding module 308 with the initial decoding result 154 as the decoding result 154 parallel to or simultaneously as the joint detection module 304.

The decoding module 308 can use the first communication unit 216, the second communication unit 236, the first control unit 212, the second control unit 234, or a combination thereof to calculate the decoding result 154 from the receiver signal 124. The decoding module 308 can store the decoding result 154 in the first communication unit 216, the second communication unit 236, the first storage unit 214, the second storage unit 246, or a combination thereof.

After decoding the decoding result 154, the control flow can be passed from the decoding module 308 to the arrangement module 310. The control flow can pass similarly as described above between the receiver module 302 and the joint detection module 304 but using processing results of decoding module 308, such as the decoding result 154.

The arrangement module 310 is configured to interleave the decoding result 154. The arrangement module 310 can be similar to the deinterleaver module 306. The arrangement module 310 can implement an opposite or a complementary method or process as the deinterleaver module 306. The arrangement module 310 can interleave according to the predetermined coding scheme.

After interleaving the decoding result 154, the control flow can be passed from the arrangement module 310 to the serving cancellation module 312. The control flow can pass similarly as described above between the receiver module 302 and the joint detection module 304 but using processing results of arrangement module 310, such as an interleaved instance of the decoding result 154.

The serving cancellation module 312 is configured to remove the receiver serving portion 126 from the receiver signal 124. The serving cancellation module 312 remove the receiver serving portion 126 by cancelling the decoding result 154 from the receiver signal 124.

The serving cancellation module 312 can cancel the decoding result 154 from the receiver signal 124 by generating an estimate of the receiver interference portion 128 of FIG. 1 including a residual signal 326. The serving cancellation module 312 can generate the estimate of the receiver interference portion 128 based on a symbol probability 328. The symbol probability 328 is one or more a posteriori probabilities of one or more symbols corresponding to the serving signal 110. The symbol probability 328 can be based on the decoding result 154.

The symbol probability 328 can be further based on:

$$\mathbb{P}[x_i[k] = x] = \prod_{j=1}^{log|C_{m_i}|} \mathbb{P}[b_j(x_i[k]) = b_j(x)]. \quad \text{Equation (4)}$$

The symbol probability can be represented as '$\mathbb{P}[x_i[k]=x]$'. The term '$C_m$' can represent a set of constellation points of modulation scheme '$m \in \mathcal{M}$' in the complex domain, where '$\mathcal{M}$' can represent the set of candidate modulation formats. The terms '$m_i$' and '$m_i'$' can represent the serving modulation scheme 114 and the interference modulation scheme 121 of FIG. 1, respectively, of the transmit symbols for the i-th layer. Moreover, '$m=\{m_1, \ldots, m_L\}$' and '$m'=\{m_1', \ldots, m_L'\}$' can represent the sets of modulation formats for the serving signal 110 and the interference signal 120, respectively. The term '$b_j(x)$' can represent where $b_j(x)$ is the j-th bit of the symbol '$x$'.

The symbol probability 328 can further be represented by:

$$\mathbb{P}[b_i(x_i[k]) = l] = \frac{e^{(2l-1)\lambda_{ij}^{DEC}[k]/2}}{e^{\lambda_{ij}^{DEC}[k]/2} + e^{-\lambda_{ij}^{DEC}[k]/2}}. \quad \text{Equation (5)}$$

The serving cancellation module 312 can use Equation (5) in implementing Equation (4) for $l \in \{0,1\}$.

The estimate of the receiver interference portion 128 can include the residual signal 326, the actual instance of the receiver interference portion 128, the noise portion 130, or a combination thereof. The residual signal 326 is remaining portions of the receiver serving portion 126 based on incomplete cancellation thereof. The residual signal 326 can be a portion of the receiver signal 124 corresponding to the serving signal 110 remaining after cancelling the decoding result 154 from the receiver signal 124.

The serving cancellation module 312 can generate the estimate of the receiver interference portion 128 including the residual signal 326 by soft cancelling the decoding result 154 from the receiver signal 124, the decoding result 154 for representing the serving signal 110. The serving cancellation module 312 can generate the estimate of the receiver interference portion 128 by implementing an assumption that the desired symbols corresponding to the serving signal 110 have a priori probabilities equal to the symbol probability 328.

The serving cancellation module 312 can generate the estimate of the receiver interference portion 128 using:

$$y'[k]=y[k]-H[k]\mathbb{E}x[k]=H[k](x[k]-\mathbb{E}x[k])+G[k]w[k]+z[k]. \quad \text{Equation (6)}.$$

The term '$y'[k]$' can represent the estimate of the receiver interference portion 128. The term '$H[k](x[k]-\mathbb{E}x[k])$' can represent the residual signal 326. The term '$G[k]w[k]$' can represent the receiver interference portion 128.

The serving cancellation module 312 can use the first communication unit 216, the second communication unit 236, the first control unit 212, the second control unit 234, or a combination thereof to generate the estimate of the receiver interference portion 128 including the residual signal 326. The serving cancellation module 312 can store the estimate of the receiver interference portion 128, the residual signal 326, the symbol probability 328, or a combination thereof in the first communication unit 216, the second communication unit 236, the first storage unit 214, the second storage unit 246, or a combination thereof.

It has been discovered that the estimate of the receiver interference portion 128, including the residual signal 326, resulting from cancelling the decoding result 154 provides increased accuracy in processing the signal. The residual signal 326 can represent the portion of the receiver signal 124 corresponding to the interference signal 120. The estimate of the receiver interference portion 128 can be used to estimate the modulation scheme of the interference signal 120. The modulation scheme of the interference signal 120 can used to improve the accuracy of detecting symbols corresponding to the serving signal 110.

After generating the estimate of the receiver interference portion 128, the control flow can be passed from the serving cancellation module 312 to the residual whitening module 314. The control flow can pass similarly as described above between the receiver module 302 and the joint detection module 304 but using processing results of decoding module 308, such as the estimate of the receiver interference portion 128.

The residual whitening module 314 is configured to calculate the receiver interference portion 128. The residual whitening module 314 can calculate the receiver interference portion 128 based on removing the noise portion 130, the residual signal 326, or a combination thereof. The residual whitening module 314 can remove by implementing a whitening mechanism 330. The residual whitening module 314 can calculate the receiver interference portion 128 by adjusting or updating the estimate of the receiver interference portion 128 using the whitening mechanism 330.

The whitening mechanism 330 is a process or a method for removing any correlation within data. The residual whitening module 314 can use the whitening mechanism 330 to remove any patterns, biases, or connections within the subjected data.

The residual whitening module 314 can the approximate the estimate of the receiver interference portion 128 or the residual signal 326 therein as colored Gaussian based on the remaining effect from the receiver serving portion 126. The residual whitening module 314 can process the estimate of the receiver interference portion 128 including the residual signal 326 with the whitening mechanism 330 to implement the whitening mechanism 330 for removing or whitening the residual signal 326 from the estimate of the receiver interference portion 128 derived from the receiver signal 124.

The residual whitening module 314 can whiten based on a covariance estimate 332. The covariance estimate 332 is a calculated result for representing degree of patterns, biases, or connections within the subjected data. The covariance estimate 332 can correspond to the characterization of the remaining effect from the receiver serving portion 126. The covariance estimate 332 can further correspond to the colored Gaussian approximation for the estimate of the receiver interference portion 128 or the residual signal 326 therein.

The covariance estimate 332 can be based on:

$$\Sigma'[k] = H[k]\text{Cov}(x[k])H^*[k] + \sigma^2 I_{N_r}.$$  Equation (7).

The covariance estimate 332 can be represented by '$\Sigma'[k]$'. The term '$H[k](x[k]-\mathbb{E}x[k])$' can represent the remaining effect from the receiver serving portion 126, which can be approximated as colored Gaussian with zero mean characterized by the covariance estimate 332.

The residual whitening module 314 can further implement the whitening mechanism 330 to adjust the estimate of the receiver interference portion 128 for representing the interference signal 120. The residual whitening module 314 can effectively change the residual signal 326 as an adjustment to the noise portion 130 using the whitening mechanism 330.

The residual whitening module 314 can further effectively calculate the receiver interference portion 128 corresponding to the interference signal 120 by whitening the residual signal 326. The residual whitening module 314 can calculate the receiver interference portion 128 based on:

$$\tilde{y}'[k] = (\Sigma'[k])^{\frac{1}{2}} y'[k].$$  Equation (8)

Equation (8) can represent a processing result '$\tilde{y}'[k]$' from whitening the remaining effect from the receiver serving portion 126.

It has been discovered that the covariance estimate 332 provides reduced computational complexity. The covariance estimate 332 can implement the color Gaussian approximation for the residual part of the receiver serving portion 126, which can characterize the remnants of the receiver serving portion 126 and allow for whitening of the signal without using complex methods or processes.

It has further been discovered that the implementation of the whitening mechanism 330 for the residual signal 326 provides reduced computational complexity. The implementation of the whitening mechanism 330 for the residual signal 326 can lead to removing or accounting for the receiver serving portion 126 or a portion therein without determining the actual value or contribution thereof.

The residual whitening module 314 can implement the whitening mechanism 330 and calculate the covariance estimate 332 using the first communication unit 216, the second communication unit 236, the first control unit 212, the second control unit 234, or a combination thereof. The residual whitening module 314 can store the processing result from the whitening process or the receiver interference portion 128 in the first communication unit 216, the second communication unit 236, the first storage unit 214, the second storage unit 246, or a combination thereof.

After implementing the whitening mechanism 330, the control flow can be passed from the residual whitening module 314 to the classification module 316. The control flow can pass similarly as described above between the receiver module 302 and the joint detection module 304 but using processing results of residual whitening module 314, such as the processing result from the whitening process or the estimate of the receiver interference portion 128.

The classification module 316 is configured to estimate the interference modulation scheme 121. The classification module 316 can estimate by generating the interference modulation estimate 156. The classification module 316 can generate the interference modulation estimate 156 based on the decoding result 154 and the receiver signal 124 by implementing a classification mechanism 334 to the processing result, such as the receiver interference portion 128 or an adjusted estimate thereof, from the residual whitening module 314 generated based on removing the decoding result 154 from the receiver signal 124.

The classification module 316 can generate the interference modulation estimate 156 by implementing the classification mechanism 334 to a portion of the receiver signal 124 for representing the interference signal 120. The receiver interference portion 128 or an adjusted estimate thereof including the noise portion 130 from the residual whitening module 314 can be the receiver interference portion 128 representing the interference signal 120.

The classification mechanism 334 is a method or a process for determining the modulation scheme from a signal or a processing result thereof. The classification mechanism 334 can be for generating the interference modulation estimate 156 for representing the interference modulation scheme 121 of the interference signal 120.

The classification module 316 can implement the maximum-likelihood approach for the estimate of the receiver interference portion 128 with the classification mechanism 334. The classification module 316 can implement the classification mechanism 334 to generate the interference modulation estimate 156 based on:

$$\hat{m}' = \text{argmax}_{m' \in \mathcal{M}^{L'}} \left\{ \sum_{k=1}^{K} \log f\left(\tilde{y}'[k]; (\Sigma'[k])^{\frac{1}{2}} G[k], m'\right) \right\}.$$  Equation (9)

The term 'K' can represent the number of samples for the receiver signal 124. The interference modulation estimate 156 can be represented as '$\hat{m}'$'.

The classification module 316 can further implement the classification mechanism 334 based on:

$$f(y; G, m') = \frac{1}{|C_{m'}|} \frac{1}{\pi^{N_r}} \sum_{w \in C_{m'}} \exp(-\|y - Gw\|^2).$$ Equation (10)

For Equations (9)-(10), $$`C_{m'} = C_{m'_1} \times \ldots \times C_{m'_{L'}}`$$

can apply.

It has been discovered that implementing the classification mechanism 334 on the receiver interference portion 128 provides increased throughput. The interference modulation estimate 156 can approximate the interference modulation scheme 121 without using any designated or known information regarding the interference modulation scheme 121. The interference modulation estimate 156 can improve the signal detection process, which can reduce errors and retransmissions to provide the increased throughput.

The classification module 316 can use the first communication unit 216, the second communication unit 236, the first control unit 212, the second control unit 234, or a combination thereof to generate the interference modulation estimate 156. The classification module 316 can store the interference modulation estimate 156 in the first communication unit 216, the second communication unit 236, the first storage unit 214, the second storage unit 246, or a combination thereof.

After generating the interference modulation estimate 156, the control flow can be passed from the classification module 316 to the joint detection module 304. The control flow can pass similarly as described above between the receiver module 302 and the joint detection module 304 but using processing results of the classification module 316, such as the processing result from the interference modulation estimate 156.

The computing system 100 can implement an iterative modulation-estimate mechanism 336 for utilizing the interference modulation estimate 156 to calculate, recalculate, adjust, or a combination thereof for processing the receiver signal 124 and calculating the decoding result 154. The iterative modulation-estimate mechanism 336 is a method or a process utilizing repetition of steps to progressively improve a result or arrive at a solution involving estimation of the interference modulation scheme 121.

The iterative modulation-estimate mechanism 336, along with the various mechanisms described above, can be implemented in a variety of ways. For example, the iterative modulation-estimate mechanism 336, any one of the mechanisms described above, or a combination thereof can be implemented using hardware, such as gates or passive components, software, such as functions or routines, firmware, or a combination thereof. As a more specific example, the iterative modulation-estimate mechanism 336 can be implemented using a feedback loop, a software loop or recursion, or a combination thereof.

The iterative modulation-estimate mechanism 336 can be for characterizing the receiver interference portion 128 corresponding to the interference signal 120, and using the characterization to improve the processing for the serving signal 110 or the serving portion therein. The iterative modulation-estimate mechanism 336 can include the serving cancellation module 312, the residual whitening module 314, the classification module 316, the operations thereof, or a combination thereof. The iterative modulation-estimate mechanism 336 can include the feedback path or routine for providing the interference modulation estimate 156 to the joint detection module 304 for detecting the receiver signal 124.

The joint detection module 304 can calculate the detection result 152 with the joint detection mechanism 322 from the receiver signal 124. The joint detection module 304 can calculate the detection result 152 based on the interference modulation estimate 156.

The joint detection module 304 can utilize the interference modulation estimate 156 to detect the symbols corresponding to the serving signal 110. The joint detection module 304 can use the interference modulation estimate 156 to separate the symbols or portions corresponding to the interference signal 120. The joint detection module 304 can further use the interference modulation estimate 156 to reinforce the detection of the symbols corresponding to the serving signal 110.

The deinterleaver module 306, the decoding module 308, the arrangement module 310, or a combination thereof can operate as described above based on the detection result 152 utilizing the interference modulation estimate 156. The updated instance of the decoding result 154 can be used to calculate the content result 158 of FIG. 1.

The computing system 100 can calculate the content result 158 when error checking process passes based on the decoding result 154. The content result 158 can be represent the serving signal 110 or the serving content therein. The content result 158 can be a product of utilizing the interference modulation estimate 156 for the receiver signal 124 including the interference signal 120 without any prior information regarding the interference modulation scheme 121. The computing system 100 can repeat the above described processes based on failing the error checking process with the decoding result 154.

It has been discovered that the iterative modulation-estimate mechanism 336, the interference modulation estimate 156, and the joint detection mechanism 322 provides increased accuracy while reducing computational complexity. The iterative modulation-estimate mechanism 336, the interference modulation estimate 156, and the joint detection mechanism 322 can improve the identification or detection of the interference signal 120, leading to the increased accuracy for the signal processing for the serving signal 110. Moreover, the iterative modulation-estimate mechanism 336, the interference modulation estimate 156, and the joint detection mechanism 322 can use the decoded information of the desired signal iteratively and classify the interference signal 120 without including the portions corresponding to the serving signal 110.

Figure 4:
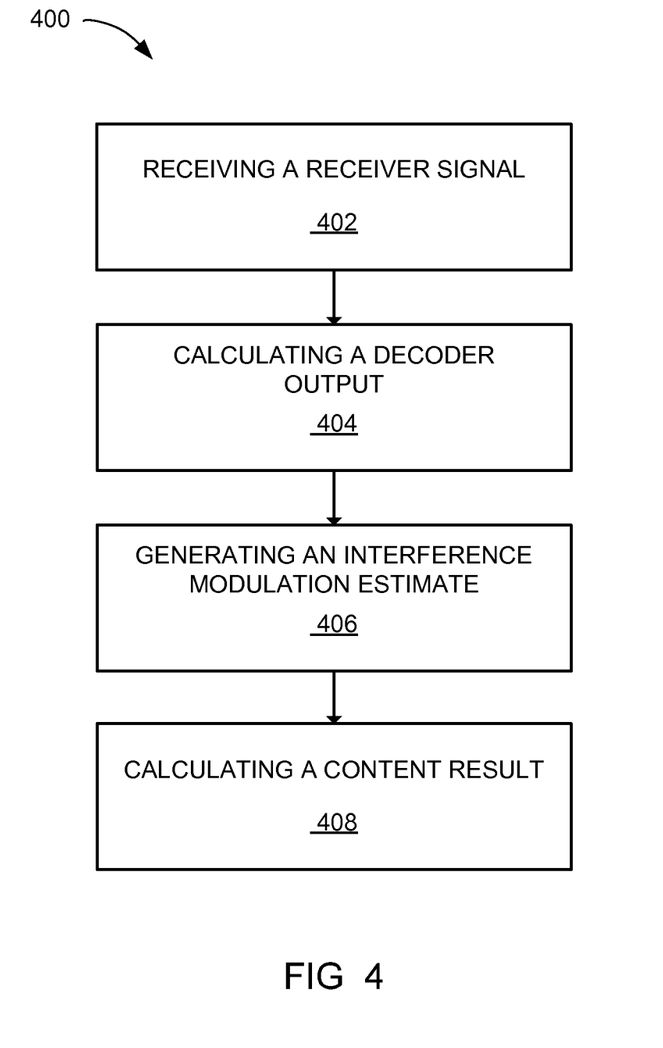
FIG. 4 is a flow chart of a method of operation of a computing system in a further embodiment of the present invention.

Referring now to FIG. 4, therein is shown a flow chart 400 of a method of operation of a computing system in a further embodiment of the present invention. The method 400 includes: receiving a receiver signal for representing a serving signal and an interference signal in a block 402; calculating a decoder output based on the receiver signal in a block 404; generating an interference modulation estimate with a communication unit based on the decoder output and the receiver signal in a block 406; and calculating a content result based on the interference modulation estimate for representing the serving signal in a block 408.

The modules described in this application can be hardware implementation or hardware accelerators, including passive circuitry, active circuitry, or both, in the first communication unit 216 of FIG. 2, the second communication unit 236 of FIG. 2, the first control unit 216 of FIG. 2, the second control unit 238 of FIG. 2, or a combination thereof. The modules can also be hardware implementation or hardware accelerators, including passive circuitry, active circuitry, or both, within the first device 102 of FIG. 1 or the second device 106 of FIG. 2, but outside of the first communication unit 216, the second communication unit 236, the first control unit 216, the second control unit 238, or a combination thereof.

The computing system 100 of FIG. 1 has been described with module functions or order as an example. The computing system 100 can partition the modules differently or order the modules differently. For example, the iterative modulation-estimate mechanism 336 can be implemented in series with processing for the serving signal 110 of FIG. 1, such as following the arrangement module 310, or in parallel therewith, simultaneously processing for the interference signal 120 of FIG. 1. Also for example, the joint detection module 304 of FIG. 3 can be combined with the classification module 316 of FIG. 3.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the first storage unit 214, the second storage unit 246, or a combination thereof can represent the non-transitory computer readable medium. The first communication unit 216, the second communication unit 236, first storage unit 214, the second storage unit 246, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the interference modulation estimate 156 of FIG. 1 for the receiver signal 124 FIG. 1 results in the movement in the physical world, such as content displayed or recreated for the user on the first device 102 from processing the serving content. The content reproduced on the first device 102, such as navigation information or voice signal of a caller, can influence the user's movement, such as following the navigation information or replying back to the caller. Movement in the physical world results in changes to the channel estimates, the interference source 118 FIG. 1, the interference signal 120 FIG. 1, or the noise portion 130 of FIG. 1, which can be fed back into the computing system 100 and influence the decoding result 154 of FIG. 1 and subsequently the interference modulation estimate 156.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    an antenna configured to receive a receiver signal for representing a serving signal and an interference signal transmitted from an interference source according to an interference modulation scheme;
    a communication unit, coupled to the antenna, configured to:
        calculate a decoding result based on the receiver signal,
        generate an interference modulation scheme estimate of the interference signal based on the decoding result and the receiver signal, and
        calculate a content result based on the interference modulation scheme estimate for representing the serving signal.

2. The system as claimed in claim 1 wherein the communication unit is configured to calculate the content result by implementing an iterative modulation-estimate mechanism for utilizing the interference modulation scheme estimate to calculate the decoding result.

3. The system as claimed in claim 1 wherein the communication unit is configured to generate the interference modulation scheme estimate by cancelling the decoding result from the receiver signal.

4. The system as claimed in claim 1 wherein the communication unit is configured to generate the interference modulation scheme estimate by implementing a whitening mechanism for removing the serving signal or a portion thereof from the receiver signal.

5. The system as claimed in claim 1 wherein the communication unit is configured to generate the interference modulation scheme estimate by implementing a classification mechanism to a portion of the receiver signal for representing the interference signal.

6. The system as claimed in claim 1 wherein the communication unit is configured to generate the interference modulation scheme estimate for representing the interference modulation scheme of the interference signal without information regarding the interference modulation scheme.

7. The system as claimed in claim 6 wherein the communication unit is configured to calculate a detection result with a joint detection mechanism from the receiver signal, the detection result based on the interference modulation scheme estimate.

8. The system as claimed in claim 6 wherein the communication unit is configured to:
    generate an estimate of a receiver interference portion including a residual signal based on soft cancelling the decoding result from the receiver signal, the decoding result for representing the serving signal;
    calculating the receiver interference portion from the estimate of the receiver interference portion by adjusting for the residual signal; and generate the interference modulation scheme estimate based on the receiver interference portion.

9. The system as claimed in claim 6 wherein the communication unit is configured to generate the interference modulation scheme estimate based on implementing a whitening mechanism for representing the interference signal.

10. The system as claimed in claim 6 wherein the communication unit is configured to calculate the decoding result using an initial decoding result.

11. A method of operation of a computing system comprising:
   receiving a receiver signal for representing a serving signal and an interference signal transmitted from an interference source according to an interference modulation scheme;
   calculating a decoding result based on the receiver signal;
   generating an interference modulation scheme estimate of the interference signal with a communication unit based on the decoding result and the receiver signal; and
   calculating a content result based on the interference modulation scheme estimate for representing the serving signal.

12. The method as claimed in claim 11 wherein calculating the content result includes implementing an iterative modulation-estimate mechanism for utilizing the interference modulation scheme estimate to calculate the decoding result.

13. The method as claimed in claim 11 wherein generating the interference modulation scheme estimate includes cancelling the decoding result from the receiver signal.

14. The method as claimed in claim 11 wherein generating the interference modulation scheme estimate includes implementing a whitening mechanism for removing the serving signal or a portion thereof from the receiver signal.

15. The method as claimed in claim 11 wherein generating the interference modulation scheme estimate includes implementing a classification mechanism to a portion of the receiver signal for representing the interference signal.

16. A non-transitory computer readable medium including instructions for a computing system, when executed by a control unit, allow the control unit to perform the instructions comprising:
   receiving a receiver signal for representing a serving signal and an interference signal transmitted from an interference source according to an interference modulation scheme;
   calculating a decoding result based on the receiver signal;
   generating an interference modulation scheme estimate of the interference signal with a communication unit based on the decoding result and the receiver signal; and
   calculating a content result based on the interference modulation scheme estimate for representing the serving signal.

17. The non-transitory computer readable medium as claimed in claim 16 wherein calculating the content result includes implementing an iterative modulation-estimate mechanism for utilizing the interference modulation scheme estimate to calculate the decoding result.

18. The non-transitory computer readable medium as claimed in claim 16 wherein generating the interference modulation scheme estimate includes cancelling the decoding result from the receiver signal.

19. The non-transitory computer readable medium as claimed in claim 16 wherein generating the interference modulation scheme estimate includes implementing a whitening mechanism for removing the serving signal or a portion thereof from the receiver signal.

20. The non-transitory computer readable medium as claimed in claim 16 wherein generating the interference modulation scheme estimate includes implementing a classification mechanism to a portion of the receiver signal for representing the interference signal.

* * * * *